United States Patent [19]

Wilson et al.

[11] 3,749,453
[45] July 31, 1973

[54] APPARATUS FOR DETECTING EMERGENCY VENTING OF BRAKE PIPE

[75] Inventors: Richard L. Wilson, Monroeville; Robert J. Worbois, Irwin, both of Pa.

[73] Assignee: Westinghouse Air Brake Company, Wilmerding, Pa.

[22] Filed: Mar. 29, 1972

[21] Appl. No.: 239,297

[52] U.S. Cl. .................................. 303/67, 303/53
[51] Int. Cl. ............................................. B60t 11/32
[58] Field of Search .................. 303/53, 60, 67, 75, 303/77

[56] References Cited
UNITED STATES PATENTS
3,525,556  8/1970  Ferguson ............................ 303/67
3,539,226  11/1970  Barber ................................ 303/20

*Primary Examiner*—Duane A. Reger
*Attorney*—Ralph W. McIntire, Jr. et al.

[57] ABSTRACT

This invention relates to locomotive brake control apparatus operable responsively to a certain pressure differential developed by a chosen rate of flow of fluid under pressure from the main fluid pressure storage reservoir on the locomotive to a train brake pipe, resulting from an emergency rate of reduction of the pressure in the train brake pipe initiated at a location in the train remote from the locomotive as a result of a ruptured or separated brake pipe occurring while effecting a brake release subsequent to effecting a reduction of pressure in the train brake pipe that is in excess of the reduction required to obtain a full service brake application on the entire train, to cause closing of the brake pipe cut-off valve of the brake valve on the locomotive and thereby termination of the supply of fluid under pressure to the train brake pipe by this brake valve irrespective of the location in the train brake pipe at which the emergency rate of reduction in train brake pipe pressure originated.

19 Claims, 4 Drawing Figures

APPARATUS FOR DETECTING EMERGENCY VENTING OF BRAKE PIPE

BACKGROUND OF THE INVENTION

The brake control equipment on most locomotives presently in use on American railroads embody a charging cut-off pilot valve device normally operable responsively to an emergency rate of reduction of pressure in the train brake pipe to cause the supply of fluid under pressure to the brake pipe cut-off valve of the brake valve on the locomotive whereupon this cut-off valve is closed, thereby rendering the relay valve of this brake valve ineffective to supply fluid under pressure to the train brake pipe. Consequently, the brake control valve on the locomotive and each car in the train thereupon operates in response to the emergency rate of reduction of pressure occurring in the train brake pipe to effect an emergency brake application on the respective vehicle in the train. Whenever an emergency rate of reduction of the pressure in the train brake pipe is initiated from a location remote from the locomotive, the resulting reduction of pressure in that portion of the train brake pipe extending from end to end of the locomotive causes the relay valve of the brake valve on the locomotive to operate in response to this reduction of pressure in this portion of the train brake pipe to effect the supply of fluid under pressure from the main reservoir on the locomotive to the train brake pipe via the brake pipe cut-off valve of this brake valve to compensate for this reduction of pressure in the train brake pipe. Therefore, it has been found that this supply of fluid under pressure to the train brake pipe, while effecting an emergency rate of reduction of pressure in the train brake pipe initiated at a location in the train remote from the locomotive as a result of a ruptured or separated brake pipe or the movement of a valve device on the last car in the train to an emergency position occurring during the time a brake release is being made after effecting a reduction of pressure in the train brake pipe that is in excess of the reduction required to obtain a full service brake application on the entire train, prevents a sufficient rapid rate of reduction of the pressure in that portion of the train brake pipe extending from end to end of the locomotive and through the first several cars nearest the locomotive to cause operation of the charging cut-off pilot valve device on the locomotive to effect the supply of fluid under pressure to the brake pipe cut-off valve and also operation of the brake control valve on the locomotive and these cars to effect an emergency brake application thereon.

Accordingly, it is the general purpose of this invention to provide means operable responsively to a chosen difference in the pressures developed on opposite sides of a restriction disposed in a conduit through which fluid under pressure flows from the main reservoir on the locomotive to the train brake pipe via the brake pipe cut-off valve of the brake valve as the result of an emergency rate of reduction in the pressure of the fluid under pressure in the train brake pipe initiated at a location in the train remote from the locomotive, as a result of a ruptured or separated brake pipe or movement of a valve device on the last car in the train to an emergency position, occurring while effecting a brake release subsequent to effecting a reduction of pressure in the train brake pipe that is in excess of the reduction required to obtain a full service brake application on the entire train, to cause closure of this brake pipe cut-off valve to prevent further flow of fluid under pressure from the main reservoir to the train brake pipe, whereupon the pressure in that portion of the train brake pipe extending from end to end of the locomotive is reduced at an emergency rate to cause operation of the charging cut-off pilot valve device on the locomotive.

SUMMARY OF THE INVENTION

According to the present invention, a locomotive brake control apparatus has embodied therein a rate of flow responsive valve device comprising a pair of diaphragm-operated spool-type valves, the diaphragm of one of which is subject on its respective opposite sides to the pressures developed on the opposite sides of a restriction disposed in a supply conduit connecting the main reservoir to a brake valve on the locomotive. The diaphragm of the other spool-type valve is subject on its respective opposite sides to brake pipe pressure and pressure in a volume supplied with fluid under pressure from the brake pipe via two parallel communications extending through the first spool-type valve, there being a check valve device disposed in one of these communications to prevent back flow in the direction of the brake pipe. Upon development of the required difference in pressures on the opposite sides of the restriction in response to flow of fluid under pressure from the main reservoir to the brake pipe by operation of the relay valve of the brake valve, as a result of an emergency rate of reduction of brake pipe pressure effected at a location in the train remote from the locomotive, the first spool-type valve is operated to close that one of the two parallel communications that does not have the check valve device therein. The second spool-type valve is thereafter operated in response to the reduction of the pressure in the train brake pipe to effect the supply of fluid under pressure from the main reservoir to the brake pipe cut-off valve to cause the closing thereof thereby terminating further flow of fluid under pressure from the main reservoir to the train brake pipe. The continued release of fluid under pressure from the train brake pipe at the point of rupture or separation of the train brake pipe, or at the last car in the train, will now cause operation of the charging cut-off pilot valve device on the locomotive to effect the supply of fluid under pressure to the brake pipe cut-off valve to maintain it closed independently of the rate of flow responsive valve device, and also operation of the brake control valve device on the locomotive and each car in the train to effect an emergency brake application on the entire train.

Figure 1:
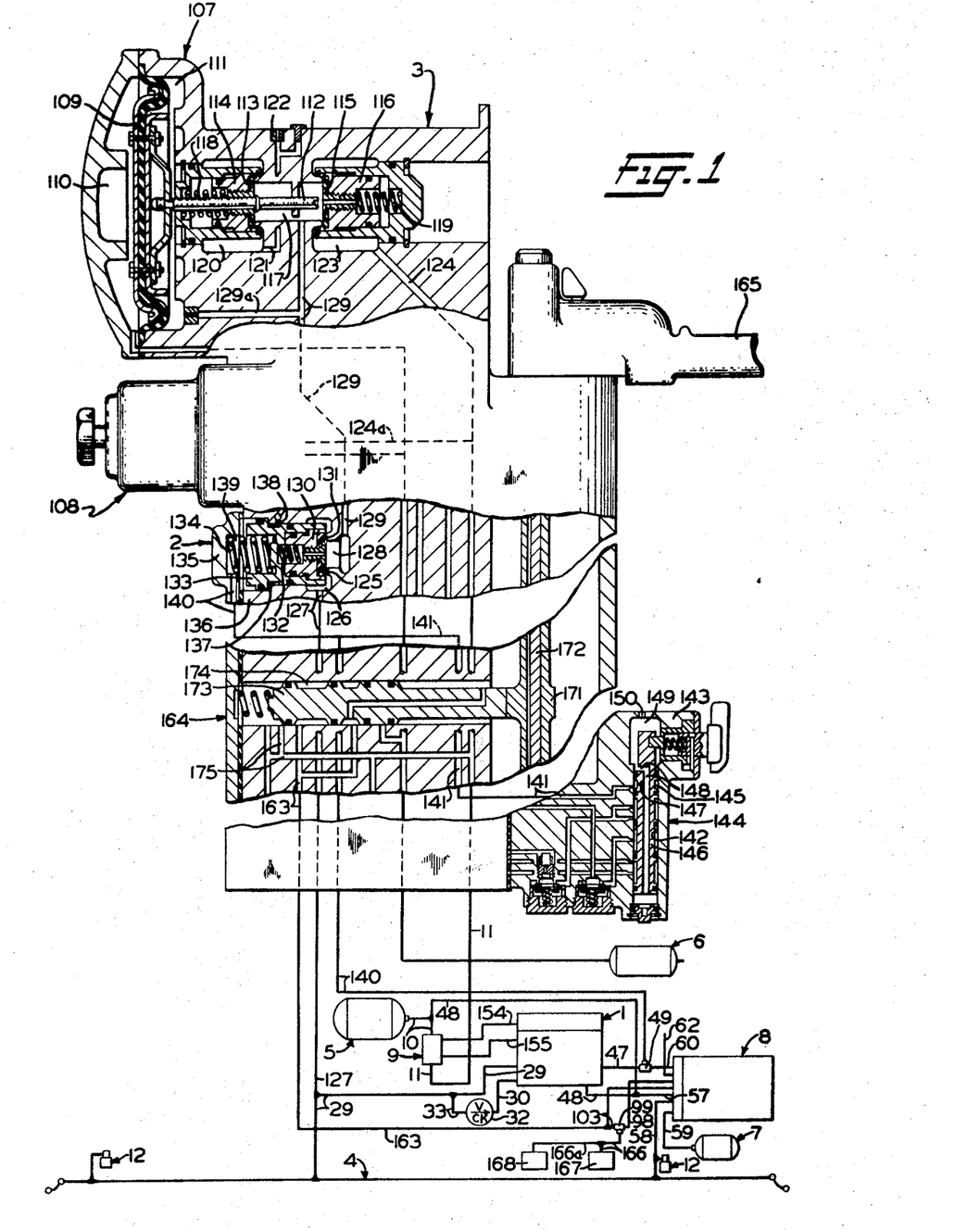
FIG. 1 is a diagrammatic view, in outline, showing a locomotive brake control apparatus embodying the invention, the engineer's brake valve included in this control apparatus being shown partly in outline and partly in cross section.

As shown in FIG. 1 of the drawings, the conventional brake control equipment heretofore provided on a locomotive is modified by the inclusion of a rate of flow responsive valve device 1 for effecting closure of a brake pipe cut-off valve 2 of an engineer's automatic brake valve 3 on the locomotive in response to an emergency rate of reduction of pressure in a train brake pipe 4 initiated at a location in the train remote from the locomotive.

This modified locomotive brake control equipment, which includes the present invention, further comprises a plurality of reservoirs including a main reservoir 5, an equalizing reservoir 6 and a volume reservoir 7, a charging cut-off pilot valve device 8, a flow indicator adapter 9 connected to the main reservoir 5 by a supply pipe 10 and to the brake valve 3 by a delivery pipe 11, and two identical vent valve devices 12 connected respectively to the respective opposite ends of that portion of the train brake pipe 4 that extends from end to end of the locomotive, it being noted that two vent valve devices per locomotive unit are provided in order to insure releasing fluid under pressure from this portion of the train brake pipe at an emergency rate whenever an emergency brake application is effected in any manner at any location in the train.

Figure 2:
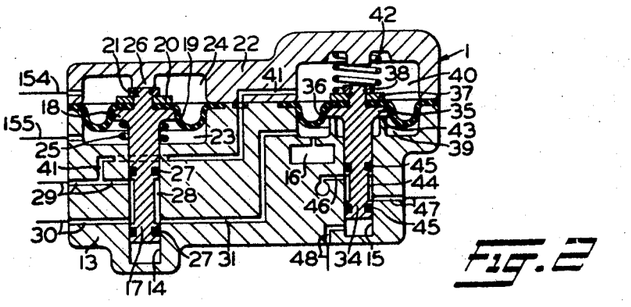
FIG. 2 is a cross-sectional view, on an enlarged scale of the rate of flow responsive valve device shown in FIG. 1.

As shown in FIG. 2 of the drawings, the rate of flow responsive valve device 1 comprises a casing 13 having formed therein a pair of parallel spaced-apart bottomed bores 14 and 15 and a volume chamber 16. Slidably mounted in the bottomed bore 14 is a first spool-type valve 17, the upper end of which is provided with an annular flange 18 from which extends a screw-threaded portion that passes through the center of a diaphragm 19 and a diaphragm follower 20 and receives a nut 21 that has screw-threaded engagement therewith to operatively connect this diaphragm 19 to the spool-type valve 17. The outer periphery of the diaphragm 19 is clamped between the upper end of the casing 13 and cover 22 that is secured to this casing by any suitable means (not shown).

The diaphragm 19 cooperates with the casing 13 and the cover 22 to form within the flow responsive valve device 1 and on opposite sides of the diaphragm a first pair of chambers 23 and 24.

Disposed within the chamber 23 and interposed between the casing 13 and the flange 18 is a spring 25 for biasing the valve 17 and the diaphragm 19 in an upward direction to the position shown in which the nut 21 abuts a stop 26 that is formed integral with the cover 22.

The spool-type valve 17 is provided with a pair of axially spaced-apart peripheral annular grooves in each of which is disposed an O-ring seal 27 to prevent leakage of fluid under pressure between the periphery of the valve 17 and the wall of the bottomed bore 14, and with an elongated peripheral annular groove 28 located between the two O-ring seals 27. This groove 28 is so located that, while the valve 17 occupies the position shown, it connects that end of two passageways 29 and 30 in the casing 13 that open at the wall surface of the bottomed bore 14, one above the other a distance equal to the length of the groove 28, with that end of a third passageway 31 in the casing 13 that opens at the wall surface of this bottomed bore 14 diametrically opposite that end of the passageway 30 that opens at this wall surface.

The passageway 29 extends through the casing 13 and is connected to the brake pipe 4 (FIG. 1) by a correspondingly numbered pipe. Likewise, the passageway 30 extends through the casing 13 and is connected to the outlet of a check valve device 32 by a correspondingly numbered pipe. The inlet of this check valve 32 is connected by a short pipe 33 to the pipe 29 intermediate the ends thereof. The purpose of this check valve device 32 is to provide for flow of fluid under pressure from the brake pipe 4 to the passageway 31 (FIG. 2) while the spool-type valve 17 occupies a lower or second position in which the upper O-ring 27 carried thereby forms a seal with the wall surface of the bottomed bore 14 at a location below that end of the passageway 29 that opens at this wall surface.

Slidably mounted in the bottomed bore 15 in the casing 13 is a second spool-type valve 34, the upper end of which has formed integral therewith an annular flange 35 from which extends a screw-threaded portion that passes through the center of a second diaphragm 36 and an annular diaphragm follower 37. A nut 38 has screw-threaded engagement with this screw-threaded portion extending upward from the flange 35 and serves to clamp the annular inner edge of the diaphragm 36 rigidly between the flange 35 and the diaphragm follower 37 thereby operatively connecting the diaphragm 36 to the valve 34. The outer periphery of the diaphragm 36 is rigidly clamped between the upper end of the casing 13 and the cover 22.

The diaphragm 36, like the diaphragm 19, cooperates with the casing 13 and the cover 22 to form within the valve device 1 and on opposite sides of the diaphragm a second pair of chambers 39 and 40. The other end of the above-mentioned passageway 31, and also the above-mentioned volume chamber 16, open into the chamber 39. Opening into the chamber 40 is one end of a passageway 41 that extends through the cover 22 and casing 13 and at its opposite end opens into the hereinbefore-mentioned passageway 29 intermediate the ends thereof.

Disposed within the chamber 40 is a spring 42 that is interposed between the diaphragm follower 37 and the cover 22. This spring 42 is effective to normally bias the flange 35 against a stop 43 integral with the casing 13 to thereby position the spool-type valve 34 in the position shown in FIG. 2 of the drawings. This valve 34 is provided with an elongated peripheral annular groove 44 and, adjacent each end of this groove 44, with a peripheral annular groove in which is disposed an O-ring seal 45 that forms a seal with the wall surface of the bottomed bore 15 to prevent leakage of fluid under pressure into the elongated groove 44 from the chamber 39 and from the bottomed bore 15. While the valve 34 occupies the position shown, the elongated groove 44 thereon establishes a communication between that end of each of a pair of passageways 46 and 47 in the casing 13 that open at the wall surface of the bottomed bore 15 one above the other a distance equal to the length of the groove 44. The lower O-ring seal 45 carried by this valve 34 closes communication between the passageway 47 and that end of a passageway 48 formed in the casing 13 and opening at one end at the wall surface of the bottomed bore 15. This passageway 48 is connected by a correspondingly numbered pipe to the hereinbefore-mentioned supply pipe 10 (FIG. 1) intermediate the ends thereof. The passageway 46 (FIG. 2) extends through the casing 13 to the exterior thereof thus forming an exhaust to atmosphere, and the passageway 47 is connected by a correspondingly numbered pipe to one input of a double check valve device 49 (FIG. 1) the other inlet of which is connected to the hereinbefore-mentioned charging cut-off valve device 8 which will not be described in detail.

Figure 3:
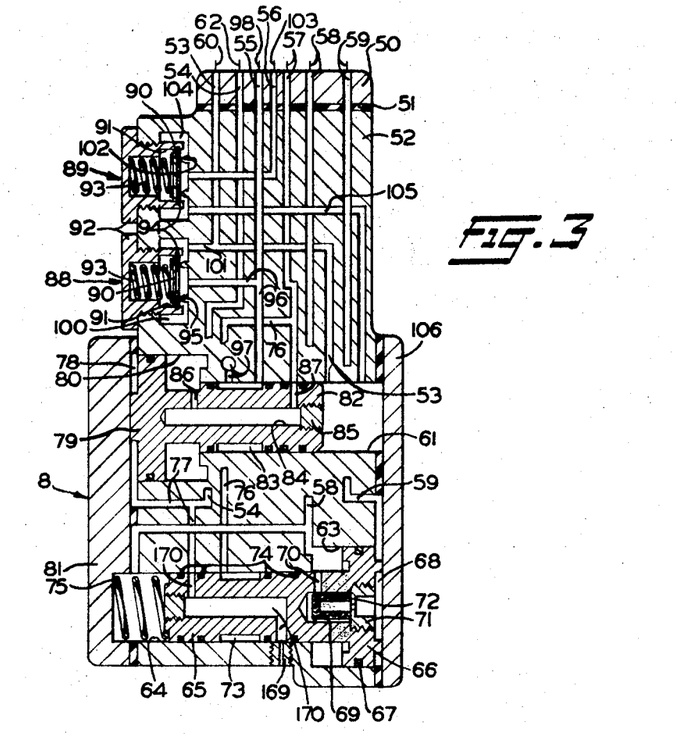
FIG. 3 is an enlarged view, in section, of the charging cut-off pilot valve device shown in outline in FIG. 1.

The charging cut-off pilot valve device 8 is shown diagrammatically in FIG. 3 of the drawings and comprises a pipe bracket 50 that is provided on its lower side with a bolting face 51 to which is secured by any suitable means (not shown) a casing 52.

Extending upward form the bolting face 51 through the pipe bracket 50 are seven ports and corresponding passageways which open at the upper side of the pipe bracket 50 these being denoted by the numerals 53, 54, 55, 56, 57, 58 and 59.

The above-mentioned other outlet of the double check valve device 49 (FIG. 1) is connected by a pipe 60 to the port 53 (FIG. 3) at the upper side of the pipe bracket 50 and the corresponding passageway 53 extends through the pipe bracket 50 and casing 52 and opens at its other end at the wall surface of bore 61 extending through the casing 52.

Connected to the port 54 is one end of a pipe 62 the opposite end of which is connected to the usual sanding equipment provided on locomotives. This sanding equipment has been omitted from the drawings since it forms no part of the present invention.

Opening at the wall surface of the bore 61 at a location on the left-hand side of the location at which the passageway 53 opens at this wall surface is one end of the above-mentioned passageway 57 that extends through the casing 52 and pipe bracket 50 and is connected by a correspondingly numbered pipe to the hereinbefore-mentioned pipe 48 intermediate the ends thereof, it being remembered that this pipe 48 is connected to the supply pipe 10 that is connected to the main reservoir 5 (FIG. 1).

The port 58 (FIG. 3) at the upper side of the pipe bracket 50 is connected by a correspondingly numbered pipe to the brake pipe 4, as shown in Fig. 1. The corresponding passageway 58 (FIG. 3) extends through the casing 52 and opens at the left-hand end of a counterbore 63 therein that is coaxial with a bore 64 in this casing 52. Slidably mounted in the bore 64 is a spool-type valve 65 that has formed integral therewith at its right-hand end an actuating piston 66 which is slidably mounted in the counterbore 63.

The actuating piston 66 is provided with a peripheral annular groove in which is disposed an O-ring seal 67 that forms a seal with the wall surface of the counterbore 63 to prevent leakage of fluid under pressure between the periphery of the piston 66 and the wall of the counterbore 63 from a chamber 68 on the right-hand side of the piston to the left-hand end of the counterbore 63. Opening into the chamber 68 is one end of the hereinbefore-mentioned passageway 59 that extends through the casing 52 and pipe bracket 50 and is connected by a correspondingly numbered pipe to the volume reservoir 7 (FIG. 1).

In order to provide for charging the volume reservoir 7 (FIG. 1) from the brake pipe 4, the piston 66 (FIG. 3) and spool-type valve 65 have formed therein a bottomed bore 69 the left-hand end of which, as viewed in FIG. 3, is open to the interior of the counterbore 63 via a short passageway 70. The right-hand end of the bottomed bore 69 is provided with internal screw threads for receiving a screw-threaded choke plug 71. Consequently, fluid under pressure flows from the brake pipe 4 to volume reservoir 7 via pipe and corresponding passageway 58, that portion of the counterbore 63 on the left-hand side of the piston 66, short passageway 70, bottomed bore 69, a strainer device 72, disposed in the bottomed bore 69, choke plug 71, chamber 68, and passageway and corresponding pipe 59 until the volume reservoir 7 is charged to the normal chosen pressure to which the brake pipe 4 is charged.

As shown in FIG. 3, the spool-type valve 65 has formed thereon an elongated peripheral annular groove 73 and adjacent each end of this groove, a pair of spaced-apart peripheral annular grooves in each of which is disposed an O-ring seal 74 that forms a seal with the wall surface of the bore 64.

When the spool-type valve 65 is moved by the piston 66, in a manner hereinafter explained, from the position shown in FIG. 3 against the yielding resistance of a spring 75 to a second position, the groove 73 establishes a communication between a passageway 76, one end of which opens at the wall surface of the bore 64 and the opposite end of which opens into the passageway 57 intermediate the ends thereof, and a passageway 77 one end of which opens at the wall surface of the bore 64 on the left-hand side of the location at which the one end of the passageway 76 opens at the wall surface of this bore.

The passageway 77 extends through the casing 52 and at its other end opens into a chamber 78 formed between a cut-off piston 79 that is slidably mounted in a counterbore 80 coaxial with the bore 61 in the casing 52 and a cover member 81 that closes the left-hand ends of the bore 64 and the counterbore 80 and is secured to the casing 52 by any suitable means (not shown).

Opening into the passageway 77 intermediate the ends thereof is the hereinbefore-mentioned passageway 54 to the corresponding port of which is connected one end of the pipe 62 leading to the locomotive sanding equipment, as aforestated.

Formed integral with the cut-off piston 79 is a spool-type valve 82 that is slidably mounted in the bore 61 and has formed thereon an elongated peripheral annular groove 83. This spool-type valve 82 is further provided with a bottomed bore 84 the right-hand end of which has internal screw threads for receiving a screw-threaded plug 85 to close the right-hand end of this bottomed bore. Adjacent its left-hand end the bottomed bore 84 is open to the interior of the counterbore 80 via a short passageway 86. Likewise, adjacent its right-hand end the bore 84 is open to the peripheral surface of the valve 82 via a short passageway 87 which, while the valve 82 occupies the position shown in FIG. 3, registers with the hereinbefore-mentioned one end of the passageway 57 that opens at the wall surface of the bore 61. Since the passageway 57 is connected by the correspondingly numbered pipe, the pipe 48 (FIG. 1) and supply pipe 10 to the main reservoir 5, fluid under pressure flows from this reservoir to the right-hand face of the piston 79 (FIG. 3) via pipes 10 and 48, pipe and passageway 57, short passageway 87, bottomed bore 84, short passageway 86 and counterbore 80, and is effective to normally maintain the piston 79 and valve 82 in the position shown in FIG. 3.

The charging cut-off pilot valve device 8 further comprises a pair of spaced-apart identical check valve devices 88 and 89. Therefore, a description of one will suffice for both, it being understood that corresponding parts of the check valve device 89 have the same reference numerals as those of the check valve device 88.

Each of the check valve devices 88 and 89 comprises a flat disc valve 90 which is slidably disposed in a counterbore 91 formed in a cap nut 92 that has screw-threaded engagement with corresponding internal screw threads provided in the casing 52, and is biased toward a corresponding valve seat by a spring 93 interposed between the flat disc valve 90 and the cap nut 92.

To facilitate assembly and disassembly of the cap nut 92, spring 93 and flat disc valve 90 as a unit, the spring 93 and flat disc valve 90 are retained in the counterbore 91 by a snap ring 94 that is inserted in a groove formed in the wall of this counterbore.

As shown in FIG. 3, the spring 93 of the check valve device 88 is effective to normally bias the corresponding flat disc valve 90 against an annular valve seat 95 that is formed at one end of a passageway 96 that extends through the casing 52 and opens at its opposite end at the wall surface of the bore 61 on the left-hand side of the location at which the hereinbefore-mentioned one end of the passageway 57 opens at this wall surface a distance equal to the length of the groove 83. While the spool-type valve 82 occupies the position shown in FIG. 3, the groove 83 thereon establishes a communication between the passageway 96 and a passageway 97 that is open to atmosphere.

Opening into the passageway 96 intermediate the ends thereof is the hereinbefore-mentioned passageway 55 to the corresponding port of which is connected one end of a pipe 98 that has its opposite end connected to the right-hand inlet of a second double check valve device 99 (FIG. 1).

The cap nut 92 (FIG. 3) of the check valve device 88 cooperates with the casing 52 to form therein a chamber 100 into which opens one end of a short passageway 101 that at its opposite end opens into the hereinbefore-mentioned passageway 53 intermediate the ends thereof.

As is also shown in FIG. 3, the spring 93 of the check valve device 89 is effective to normally bias the corresponding flat disc valve 90 of this check valve device against an annular valve seat 102 that is formed at one end of the hereinbefore-mentioned passageway 56 to the corresponding port of which is connected one end of a pipe 103 the opposite end of which is connected to the left-hand inlet of the hereinbefore-mentioned double check valve device 99 (FIG. 1).

The cap nut 92 (FIG. 3) of the check device 89 cooperates with the casing 52 to form therein a chamber 104 into which opens one end of a passageway 105 that extends through the casing 52 and opens into the bore 61 therein adjacent the right-hand end thereof which is closed by a cover member 106 that also closes the right-hand end of the counterbore 63 and is secured to the casing 52 by any suitable means (not shown).

The engineer's automatic brake valve 3 (FIG. 1) may be of the self-lapping type such as that disclosed in U.S. Pat. No. 2,958,561, issued November 1, 1960 to Harry C. May, and assigned to the assignee of the present application.

The brake valve 3 (FIG. 1) comprises a relay valve 107, a self-lapping regulating or control valve 108, and the hereinbefore-mentioned brake pipe cut-off valve 2.

Relay valve 107 comprises a diaphragm 109 (FIG. 1), which is subject opposingly to fluid pressures in a chamber 110 and a chamber 111 and is adapted through the medium of a coaxially arranged operating stem 112 to effect unseating of a disc-shaped exhaust valve 113 carried by an annular valve member 114, or effect unseating of a disc-shaped supply valve 115 carried by a coaxially arranged annular valve member 116, according to whether pressure in chamber 110 is less than or exceeds the pressure in chamber 111. Stem 112 is coaxially connected to the chamber 111 side of diaphragm 109 and projects centrally through valve member 114 and through a chamber 117 and is adapted to abut one end of supply valve member 116. Helical springs 118, 119 urge the valve members 114, 116 toward each other for normally concurrently seating the valves 113, 115. Exhaust valve 113 controls communication between chamber 117 and a chamber 120 which is open to atmosphere via a passageway 121 and an exhaust choke 122; whereas supply valve 115 controls communication of chamber 117 with a supply chamber 123 that is always open to main reservoir 5 via a passageway 124 to one end of which is connected one end of the hereinbefore-mentioned delivery pipe 11, the pipe 11, flow indicator adapter 9 hereinafter described in detail and the supply pipe 10.

The brake pipe cut-off valve 2 comprises an annular cut-off valve 125 that is disposed in a chamber 126 which is constantly in communication with the brake pipe 4 via a passageway and correspondingly numbered pipe 127 that is connected to the hereinbefore-mentioned pipe 29 intermediate the ends thereof which pipe 29 is connected to the brake pipe 4, as aforestated. This cut-off valve 125 controls communication between a chamber 128 that is connected respectively to the chamber 117 by a passageway 129 and to the chamber 111 by a branch passageway 129a and the chamber 126, and is carried by an annular member 130 normally biased against an annular valve seat 131 by a spring 132 interposed between the annular member 130 and one side of a piston member 133. A second spring 134 is interposed between the opposite side of the piston member 133 and a cover member 135 secured to a main casing 136 of the sectionalized casing of the brake valve 3 by any suitable means (not shown). An annular chamber 137 at the right-hand side of the piston member 133 is constantly open to atmosphere via an exhaust passageway and port 138, and a chamber 139 at the left-hand side of this piston member 133 is normally vented to atmosphere via a passageway and correspondingly numbered pipe 140 that is connected to the outlet connection of the hereinbefore-mentioned double check valve device 49 and one or both of two pathways now to be described, depending on the position of the valve element (not shown) of this valve device 49.

If the valve element of the double check valve device 49 is in the position in which communication between the pipes 140 and 47 is closed, the chamber 139 at the left-hand side of the piston member 133 is open to atmosphere via the passageway 140, a passageway 141 one end of which opens into the passageway 140 intermediate the ends of this passageway 140 and the opposite end of which opens at the wall surface of a bore 142 provided in a second casing section 143 of the sectionalized casing of the brake valve 3 that incorporates therein a manually operated cut-off valve 144, a peripheral annular groove 145 formed on a spool-type valve 146 slidably mounted in the bore 142, a choke 147 and a passageway 148 in the spool-type valve 146, a chamber 149 in the casing section 143 and a port 150 provided in this casing section.

If the valve element of the double check valve device 49 is in the position in which a communication between the pipes 140 and 47 is open, the camber 139 is open to atmosphere via the pathway described above and also via passageway and pipe 140, double check valve device 49, pipe and passageway 47, groove 44 (FIG. 2) on valve 34 and exhaust passageway 46 in casing 13 of rate of flow responsive valve device 1.

Figure 4:
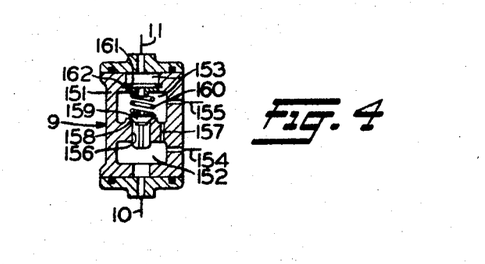
FIG. 4 is an enlarged view, in section, of the flow indicator adapter shown in outline in FIG. 1.

The hereinbefore-mentioned flow indicator adapter 9 (FIG. 4) comprises a casing 151 having therein two chamber 152 and 153 into which open respectively one end of the supply pipe 10 and the delivery pipe 11 and also respectively one end of a pair of pipes 154 and 155. The other end of the pipe 154 opens into the chamber 24 (FIG. 2) at the upper side of the diaphragm 19, and the other end of the pipe 155 opens into the chamber 23 at the lower side of this diaphragm 19. The chambers 152 and 153 (FIG. 4) are connected by two parallel bores 156 and 157, the bore 157 being of small diameter so as to constitute a choke. An annular valve seat 158 is formed at the upper end of the bore 156 and a check valve 159 is normally biased against this valve seat 158 by a spring 160 that is interposed between this check valve and a spring seat 161 that abuts a snap ring 162 carried by the casing 151.

Each of the two vent valve devices 12 shown in outline in FIG. 1 of the drawings may be of the type such as that disclosed in U.S. Pat. No. 3,165,115, issued Jan. 12, 1965, to Erik G. Erson, and assigned to the assignee of the present application, and, in view of this, it is believed unnecessary to show and describe this device in detail. Briefly, however, as described in the abovementioned patent, each vent valve device 12 is operative in response to only a reduction of the pressure in the train brake pipe 4 at an emergency rate to locally vent fluid under pressure from the brake pipe 4 at a rapid rate.

Connected to the hereinbefore-mentioned pipe 103 intermediate the ends thereof is one end of a pipe 163 the opposite end of which is connected to a correspondingly numbered passageway that leads to an emergency valve 164 of the brake valve 3, it being understood that this emergency valve forms no part of the present invention. Briefly, however, this emergency valve 164 is operative to supply fluid under pressure to the pipes 163 and 103 upon movement of a handle 165 of the brake valve 3 to its emergency position. Fluid under pressure thus supplied to the pipe 103 flows via the double check valve device 99 and a pipe 166 to a power cut-off switch 167 to cause cut off of the supply of electrical current to the driving motors of the locomotive, it being noted that a branch pipe 166a connects the pipe 166 to a dynamic brake cut-out switch 168 so that the dynamic brake is simultaneously cut out. Furthermore, the fluid under pressure supplied to the pipe 103 flows to the right-hand end of the bore 61 (FIG. 3) via passageway 56, past check valve 90 of double check valve device 89, chamber 104 and passageway 105 to move the valve 82 and piston 79 to the position shown in FIG. 3 if they have been previously moved to this position.

OPERATION

To initially charge the brake control equipment shown in FIG. 1 of the drawings, the diesel engines are started for operating fluid compressors (not shown) to effect charging of the main reservoir 5.

It may be assumed that the handle 165 of engineer's automatic brake valve 3 shown in FIG. 1 of the drawings is in its release position and the spool-type valve 146 of the manually operated cut-off valve 144 occupies the position shown. Therefore, while the brake valve handle 165 is in its release position, the self-lapping regulating valve 108 of this brake valve 3 is effective, as explained in the above-mentioned U.S. Pat. No. 2,958,561, to supply fluid under pressure from the main reservoir 5, which is connected to this regulating valve device via supply pipe 10, flow indicator adapter 9, pipe 11, passageway 124 and a branch 124a of this passageway, to the equalizing reservoir 6 and chamber 110 in the relay valve 107. Consequently, the relay valve 107 will operate to effect the supply of fluid under pressure from the supply chamber 123, that is connected to the main reservoir 5 via the passageway 124, pipe 11, flow indicator adapter 9 and pipe 10, to the chamber 117 from whence it will flow to the chamber 128 and unseat the cut-off valve 125 from its seat 131.

With cut-off valve 125 unseated, fluid under pressure supplied to the chamber 128 from the main reservoir 5 will flow past this valve 125 and thence to the train brake pipe 4 via passageway and pipe 127 and pipe 29. Thus, fluid under pressure is supplied from the main reservoir 5 on the locomotive to the train brake pipe until this pipe is fully charged to the pressure normally carried therein as determined by the setting of the regulating valve 108.

The brake control valves (not shown) on the locomotive and cars in the train will operate in response to the charging of the train brake pipe to effect a release of the brakes on the entire train.

A service brake application and a subsequent brake release on the locomotive and cars in the train can be effected in the usual manner and need not be described in detail herein since the present invention relates only to an emergency brake application initiated at a location in the train brake pipe remote from the locomotive.

Let it now be supposed that, while effecting a brake release on the locomotive and cars in the train, subsequent to effecting a reduction of pressure in the train brake pipe that is in excess of the reduction required to obtain a full service brake application on the entire train, the hose connection between two adjacent cars in the train remote from the locomotive becomes ruptured or separated, or a valve device on the last car in the train is manually moved to a position for releasing fluid under pressure from the train brake pipe to atmosphere at an emergency rate.

As fluid under pressure is thus released from the train brake pipe, the pressure therein will be reduced progressively from the point of release toward the locomotive at the head end of the train, it being understood that farther from the point of release, the higher will be the pressure in the train brake pipe.

It being remembered that the handle 165 of the brake valve 3 on the locomotive now occupies its release position, the relay valve 107 of this brake valve 3 will operate in response to this reduction of pressure in the train brake pipe effected at a location from the locomotive to cause the supply of fluid under pressure from the main reservoir 5 to that portion of the train brake pipe 4 extending from end to end of the locomotive simultaneously as fluid under pressure is released from the train brake pipe to atmosphere at this location remote from the locomotive. Consequently, the reduction of pressure in that portion of the train brake pipe 4 extending from end to end of the locomotive is not sufficiently rapid to cause operation of the two vent valve devices 12 connected thereto, as shown in FIG. 1, since, as explained in the hereinbefore-mentioned U.S. Pat. No. 3,165,115, these vent valve devices operate to release fluid under pressure from the train brake pipe to atmosphere only in response to an emergency rate of reduction of pressure in the brake pipe.

Especially in the case of a long train, without operation of these two vent valve devices 12 to release additional fluid under pressure from that portion of the train brake pipe 4 extending from end to end of the locomotive to atmosphere, the rate of reduction of pressure effected in this portion of the train brake pipe is not in excess of the rate at which fluid under pressure can flow from the volume reservoir 7 to the train brake pipe 4 via pipe and passageway 59, chamber 69 (FIG. 3), the choke plug 71 carried by the actuating piston 66 of the charging cut-off pilot valve device 8, strainer device 72, passageway 70, counterbore 63 and passageway and pipe 58. Therefore, a differential of pressure sufficient to overcome the yielding resistance of the spring 75 is not established on the opposite sides of the actuating piston 66 and the charging cut-off pilot valve device 8 is not operated in response to either the rupture or separation of the hose connection between the two cars in the train remote from the locomotive, or the manual movement of the valve device of the last car in the train to the position for releasing fluid under pressure from the train brake pipe to atmosphere at an emergency rate.

Since the charging cut-off pilot valve device 8 is not operated in response to the emergency rate of reduction of pressure in the train brake pipe effected at the location remote from the locomotive, no fluid under pressure is supplied by this valve device 8 to the chamber 139 (FIG. 1) in the brake pipe cut-off valve 2 of the brake valve 3 on the locomotive to cause seating of the cut-off valve 125 on the seat 131 to prevent the supply of fluid under pressure from the main reservoir 5 to the train brake pipe 4 by operation of the relay valve 107 of brake valve 3. Consequently, fluid under pressure will continue to flow from the main reservoir 5 to the train brake pipe 4 via supply pipe 10, flow indicator adapter 9, pipe 11, passageway 124, relay valve 107, passageway 129, brake pipe cut-off valve 2, passageway and pipe 127 and pipe 29.

It is apparent that as fluid under pressure flows from the main reservoir 5 to the train brake pipe 4 in the manner just described, a difference of pressure in the chambers 152 and 153 (FIG. 4) in the flow indicator adaptor 9 is produced which increases in magnitude accordingly as the rate of flow of fluid under pressure from the main reservoir 5 to the brake pipe 4 increases.

Since the chamber 152 (FIG. 4) is connected to the chamber 24 (FIG. 2) in the rate of flow responsive valve device 1 via the pipe 154, and the chamber 153 is connected to the chamber 23 in this valve device 1 via the pipe 155, a corresponding difference of pressure is produced in the chambers 24 and 23 which establishes a differential on the respective opposite sides of the diaphragm 19.

The strength of the spring 25 may be such that, upon the difference in the pressures acting on the opposite sides of the diaphragm 19 reaching a value of, for example, 8 pounds per square inch, this diaphragm 19 is deflected in a downward direction against the yielding resistance of the spring 25 to move the valve 17 in the same direction to a position in which the upper O-ring seal 27 carried by this valve 17 forms a seal with the wall surface of the bottomed bore 14 at a location below that at which the end of the passageway 29 opens at this wall surface, thus closing communication between the passageway 29 and the passageway 31 which is connected to the chamber 39 below the diaphragm 36, it being remembered that the volume chamber 16 opens into the chamber 39. Consequently, the fluid under pressure in the chamber 39 and in the volume chamber 16 is trapped therein by the check valve 32 (FIG. 1) which prevents back flow to the brake pipe 4.

Since the chamber 40 (FIG. 2) above the diaphragm 46 is connected to the brake pipe 4 via the passageway 41 and passageway and pipe 29, the pressure in the chamber 40 will be reduced simultaneously as the pressure in the brake pipe 4 is reduced.

The strength of the spring 42 may be such that, upon the pressure in the chamber 40 becoming, for example, 5 pounds per square inch less than the trapped pressure in the chamber 39, this trapped pressure will deflect the diaphragm 36 upward against the yielding resistance of the spring 42 and move the valve 34 upward therewith to a position in which the lower O-ring seal 45 carried by the valve 34 forms a seal with the wall surface of the bottomed bore 15 at a location that is above the location at which the end of the passageway 47 opens at this wall surface and below that at which the end of the exhaust passageway 46 opens at this wall surface.

When the valve 34 is moved upward to the position just described, fluid under pressure will flow from the main reservoir 5 to the chamber 139 in the brake pipe cut-off valve device 2 of the engineer's brake valve 3 via supply pipe 10, pipe and passageway 48, bottomed bore 15, passageway and pipe 47, double check valve device 49, and pipe and passageway 140. This supply of fluid under pressure to the chamber 139 effects movement of the piston member 133 and annular member 130 in the direction of the right hand until cut-off valve 125 is seated on valve seat 131 thereby preventing further supply of fluid under pressure from the main reservoir 5 on the locomotive to the train brake pipe by operation of the relay valve 107 of the brake valve 3.

It is apparent that, subsequent to the seating of the cut-off valve 125 on its seat 131 in the manner just explained to render the relay valve 107 ineffective to operate to supply fluid under pressure to the train brake pipe, the pressure therein will be rapidly reduced as the result of the release of fluid under pressure therefrom at an emergency rate at the point of rupture or separation of the hose connection between two adjacent cars in the train remote from the locomotive, or via the valve device located on the last car in the train. Consequently, an emergency rate of reduction of pressure in that portion of the train brake pipe extending from end to end of the locomotive is quickly developed as fluid under pressure flows through the train brake pipe from the locomotive toward the remote point of release of fluid under pressure therefrom at an emergency rate.

Accordingly, upon the rate of reduction of pressure in that portion of the train brake pipe 4 extending from end to end of the locomotive reaching an emergency rate, subsequent to seating of the cut-off valve 125 on its seat 131 to prevent further supply of fluid under pressure to the train brake pipe by the relay valve 107, the two vent valve devices 12 will operate, in the manner explained in hereinbefore-mentioned U.S. Pat. No. 3,165,115, to vent additional fluid under pressure from this portion of the train brake pipe to atmosphere. Therefore, it is apparent that fluid under pressure is now flowing from that portion of the train brake pipe extending from end to end of the locomotive at a faster rate than fluid under pressure can flow from the volume reservoir 7 to the train brake pipe via pipe and passageway 59, chamber 68 (FIG. 3), choke plug 71, strainer 72, short passageway 70, that portion of counterbore 63 on the left-hand side of piston 66 and passageway and pipe 58 since the size of the choke plug 71 is such as to prevent the flow of fluid under pressure therethrough at an emergency rate. Consequently, a pressure differential is quickly established on the opposite sides of the piston 66 which moves this piston and the valve 65 in the direction of the left hand against the yielding resistance of the spring 75 to a position in which the groove 73 on the valve 63 establishes a communication between the passageways 76 and 77.

Upon the establishment of a communication between the passageways 76 and 77 in the manner just described, fluid under pressure will flow from the main reservoir 5 (FIG. 1) to the chamber 78 (FIG. 3) on the left-hand side of the piston 79 via supply pipe 10, pipe 48, pipe and passageway 57, passageway 76 (FIG. 3), groove 73 and passageway 77. This supply of fluid under pressure from the main reservoir 5 to the chamber 78 will effect movement of the piston 79 and valve 82 in the direction of the right hand since main reservoir pressure acting on the right-hand side of piston 79 is acting on an area equal to the difference in the area of the piston 79 and the area of the spool-type valve 82.

The piston 79 and valve 82 will be moved in the direction of the right hand in the manner just explained until the groove 83 on this valve 82 establishes a communication between the passageways 57 and 96. Since the passageway and pipe 57 are connected to the main reservoir 5 via the pipes 48 and 10, fluid at main reservoir pressure will flow from the passageway and pipe 57 to the passageway 96, it being noted from FIG. 3 that one end of the passageway 55 is connected to the passageway 96 intermediate the ends thereof and the opposite end of this passageway 55 is connected to the pipe 98.

It can be seen from FIG. 1 of the drawings that the fluid under pressure thus supplied to the pipe 98 flows to the right-hand end of the double check valve device 99 to move a check valve element therein (not shown) to a position to establish a communication between the pipes 98 and 166. Therefore, upon the establishment of a communication between the pipes 98 and 166, fluid under pressure supplied to the pipe 98 flows via the double check valve device 99 and pipe 166 to the power cut-off switch 167 to cause cut off of the supply of electrical current to the driving motors of the locomotive in the usual manner.

Part of the fluid under pressure supplied to the pipe 166 in the manner explained above flows through the branch pipe 166a to the dynamic brake cut-out switch 168 to cause cut out of the dynamic brake on the locomotive.

Referring to FIG. 3, it can be seen that fluid under pressure supplied to the passageway 96, as explained above, flows to the right-hand side of the flat disc valve 90 of the check valve device 88 and unseats this valve 90 from its seat 95 against the yielding resistance of the spring 93. Upon thus unseating the valve 90, fluid at main reservoir pressure present in the passageway 96 flows past the unseated valve 90 to the chamber 100 and thence through the short passageway 101 to the passageway 53 which is connected to the right-hand inlet of the double check valve device 49 (FIG. 1) by the pipe 60.

It will be understood that the supply of fluid under pressure from the main reservoir 5 to the chamber 139 in the brake pipe cut-off valve 2 upon movement of the spool-type valve 34 (FIG. 2) to its upper position in the manner hereinbefore-described, moved the double check valve element (not shown) of the double check valve device 49 to its right-hand position in which a communication is established between pipes 47 and 140 and communication is closed between pipes 60 and 140. Consequently, the fluid under pressure supplied to the pipe 60 is ineffective to move the valve element of the double check valve device 49 to its left-hand position so long as the spool-type valve 34 (FIG. 2) occupies its upper position in which fluid under pressure from the main reservoir 5 is supplied to the pipe 47 in the manner hereinbefore explained.

As soon as the cut-off valve 125 of the brake pipe cut-off valve 2 is seated on its seat 131 in the manner hereinbefore explained, flow of fluid under pressure through the flow indicator adapter 9 ceases. Consequently, the pressures in the chambers 152 and 153 (FIG. 4) in this adapter 9, and likewise in the chambers 24 and 23 (FIG. 2) on the opposite sides of the diaphragm 19, quickly equalize, it being remembered that the chambers 152 and 153 are connected by the passageway 157 which constitutes a choke, as hereinbefore stated.

Upon equalization of pressure in the chambers 23 and 24 in the manner just explained, the spring 25 is rendered effective to deflect the diaphragm 19 upward and move the valve 17 upward until it is returned to the position shown in FIG. 2 in which the groove 28 thereon reestablishes a communication between the passageways 31 and 29. Upon this reestablishment of the communication between passageways 31 and 29, the fluid under pressure present in the volume chamber 16 and the chamber 39 below the diaphragm 36 flows to the chamber 40 above this diaphragm via the passageway 31, groove 28, passageway 26 and passageway 41 until the pressures in the chambers 39 and 40 equalize, it being noted that the passageway 29 is connected by the correspondingly numbered pipe to the train brake pipe 4 which, it will be remembered, is open to atmosphere either at the point of rupture or separation of the hose connection between two cars in the train, or at the last car in the train. Consequently, subsequent to equalization of pressure in the chambers 39 and 40, all fluid under pressure in these chambers is vented to atmosphere and the pressure therein becomes atmospheric.

Upon equalization of pressure in the chambers 39 and 40 on the opposite sides of the diaphragm 36, the spring 42 is rendered effective to return the diaphragm 36 and the valve 34 to the position shown in FIG. 2 of the drawings.

Upon the return of the valve 34 to the position shown in FIG. 2, the groove 44 on this valve 34 establishes a communication between the pipe and passageway 47 and the exhaust passageway 46. Consequently, fluid under pressure will be vented from the left-hand side of the valve element of the double check valve 49 (FIG. 1) to atmosphere.

As fluid under pressure is thus vented from the left-hand side of the valve element in the double check valve device 49, the fluid under pressure present in the pipe 60 will move this valve element to its left-hand position and then flow to the chamber 139 in the brake pipe cut-off valve 2 via this double check valve device 49 and the pipe and passageway 140. Consequently, the cut-off valve 125 is maintained seated on its seat 131 subsequent to the return of the spool-type valves 17 and 34 of the rate of flow responsive valve device 1 to the position in which they are shown in FIG. 2 to prevent the relay valve 107 from supplying fluid under pressure to the train brake pipe.

At the time piston 66 and valve 65 (FIG. 3) of the charging cut-off pilot valve device 8 were moved to their left-hand position in the manner hereinbefore described, the right-hand O-ring seal 74 carried in a peripheral annular groove provided therefor in the valve 65 is moved to a position in which it makes a seal with the wall surface of the bore 64 on the left-hand side of the location at which a choked exhaust port 169 opens at the wall surface of this bore 64. Therefore, all of the fluid present in the volume reservoir 7 will flow at a slow rate to atmosphere via pipe and passageway 59, chamber 68, choke plug 71, strainer device 72, short passageway 70, bore 64 and choked exhaust port 169. Therefore, subsequent to flow of all the fluid under pressure in the volume reservoir 7 and chamber 68 to atmosphere so that the pressure therein is reduced to atmospheric pressure, the spring 75 will move the spool-type valve 65 and piston 66 in the direction of the right hand to the position shown in FIG. 3, whereupon fluid under pressure in the chamber 78 is vented to atmosphere via passageway 77, a passageway 170 in the valve 65 which passageway at one end registers with that end of the passageway 77 that opens at the wall surface of the bore 64 and at the opposite end with the choked exhaust port 169, and this exhaust port.

To effect restoration of the piston 79 and valve 82 in the charging cut-off pilot valve device 8 to their original position subsequent to repair of the rupture of the hose connection between two adjacent cars in the train, or recoupling of the separated hose couplings, or manual movement of the valve device on the last car in the train back to its original position to cut off the flow of fluid under pressure therethrough from the train brake pipe to atmosphere, the engineer will move the handle 165 (FIG. 1) of the brake valve 3 from its release position to its emergency position.

As explained in hereinbefore-mentioned U.S. Pat. No. 2,958,561, when the handle 165 of the brake valve 3 is moved to its emergency position, a cam 171 that is mounted on a cam shaft 172, to the upper end of which the handle 165 is secured, shifts a spool-type valve 173 of the emergency valve 164 in the direction of the left hand from the position shown in FIG. 1 to a position in which an elongated peripheral annular groove 174 formed on this valve 173 establishes a communication between one end of a passageway 175 and the passageway and pipe 163. The other end of the passageway 175 opens into the passageway 124 intermediate the ends thereof, it being remembered that this passageway 124 is connected to the main reservoir 5 via pipe 11, flow indicator adapter 9 and pipe 10. Consequently, fluid under pressure will now flow from the main reservoir 5 to the passageway and pipe 163 and thence to the right-hand end of the bore 61 (FIG. 3) via pipe 103, passageway 56, past spring-loaded valve 90 of the check valve device 89, chamber 104 and passageway 105. Fluid under pressure thus supplied to the right-hand end of the bore 61 acts on the right-hand end of the spool-type valve 82 and moves this valve and the piston 79 in the direction of the left hand to the position shown in FIG. 3.

The fluid under pressure thus supplied to the right-hand end of the bore 61 will now flow therefrom to the chamber 139 (FIG. 1) via passageway 53, pipe 60, double check valve device 49 and pipe and passageway 140. However, upon subsequent movement of the brake valve handle 165 back to its release position, fluid under pressure present in the chamber 139 will be vented at a slow rate to atmosphere via passageways 140 and 141, groove 145 on spool-type valve 146, choke 147 and passageway 148 in this valve 146, chamber 149 and port 150.

After all fluid under pressure is thus vented from the chamber 139, the fluid under pressure supplied to the chamber 128 by the relay valve 107 will unseat the cut-off valve 125 from its seat 131 to establish a communication between the passageway 129 and passageway and pipe 127, it being noted that pipe 29 connects pipe 127 to train brake pipe 4.

The relay valve 107 will now operate to charge the train brake pipe to effect a brake release on the entire train in the usual manner.

Having now described the invention, what we claim as new and desire to secure by Letters Patent, is:

1. A locomotive brake control apparatus for controlling the brakes on the locomotive and the cars in a train, the combination of:
   a. normally charged brake pipe, variations of the fluid pressure in which are effective to control brake applications and brake releases on the locomotive and cars,
   b. a normally charged main reservoir,
   c. a normally charged equalizing reservoir,
   d. a brake valve having:
      i. a relay valve which is subject to the opposing pressures in said equalizing reservoir and said brake pipe and is operative by the differential of the pressures in said equalizing reservoir and in said brake pipe to effect the supply of fluid under pressure from said main reservoir to said brake pipe to control the pressure therein,
      ii. valve means operative to effect the supply of fluid under pressure from said main reservoir to said equalizing reservoir to control the pressure therein, and
      iii. fluid pressure operated brake pipe cut-off valve means interposed between said relay valve and said brake pipe and operative in response to the supply of fluid under pressure thereto to cut off flow of fluid under pressure supplied from said main reservoir to said brake pipe by operation of said relay valve,
   e. means operable in response to the rate of flow of fluid under pressure from said main reservoir to said brake pipe to establish a corresponding pressure differential, wherein the improvement comprises:

f. differential pressure operated means for controlling the supply of fluid under pressure to said fluid pressure operated brake pipe cut-off valve means to cause said cut-off valve means to cut off flow of fluid under pressure from said main reservoir to said brake pipe, said differential pressure operated means comprising:
  i. a first valve means operable to effect the supply of fluid under pressure from a source of fluid under pressure to said pipe cut-off valve means and the subsequent release of said fluid under pressure from said brake pipe cut-off valve means to atmosphere,
  ii. a movable abutment operably connected to said first valve means for effecting the operation thereof, the respective opposite sides of said abutment being subject to fluid under pressure supplied thereto from said brake pipe, and
  iii. a second valve means operable by fluid under pressure to control the supply of fluid under pressure from said brake pipe to one side of said movable abutment and operable in response to the establishment of a chosen differential by said rate of flow responsive means to prevent flow of fluid under pressure from said one side of said movable abutment to said brake pipe to render said movable abutment operative in response to a reduction of brake pipe pressure on the opposite side thereof to cause said first valve means to supply fluid under pressure from said source of fluid under pressure to said fluid pressure operated brake pipe cut-off valve means to cause operation thereof to cut off flow of fluid under pressure supplied from said main reservoir to said brake pipe by operation of said relay valve.

2. A locomotive brake control apparatus, as recited in claim 1, further characterized in that said second valve means operable by fluid under pressure comprises a two-position valve, said valve in one of said positions establishing two parallel communication from said brake pipe to said one side of said movable abutment, and in the other of said positions closing one of said two parallel communications.

3. A locomotive brake control apparatus, as recited in claim 1, further characterized by volume means connected to said one side of said movable abutment.

4. A locomotive brake control apparatus, as recited in claim 1, further characterized by a one-way flow valve means to provide for flow of fluid under pressure from said brake pipe to said one side of said movable abutment while said second fluid pressure operated valve means prevents flow of fluid under pressure from said one side of said movable abutment to said brake pipe to insure the supply of fluid under pressure to said one side of said movable abutment notwithstanding operation of said second fluid pressure operated valve means to prevent flow of fluid under pressure from said one side of said movable abutment to said brake pipe.

5. A locomotive brake control apparatus, as recited in claim 1, further characterized by a one-way flow valve means so interlocked with said second fluid pressure operated valve means as to provide for simultaneous supply of fluid under pressure from said brake pipe to both sides of said movable abutment upon an initial increase in the pressure in said brake pipe, while said second valve means prevents flow of fluid under pressure from said one side of said movable abutment to said brake pipe, to insure operation of said first valve means to cut off the supply of fluid under pressure from said source of fluid pressure to said brake pipe cut-off valve means prior to operation of said second valve means to provide for flow of fluid under pressure from said one side of said movable abutment to said brake pipe.

6. A locomotive brake control apparatus, as recited in claim 1, further characterized in that said second valve means operable by fluid under pressure comprises:
  a. a movable abutment subject to the pressure differential established by said means operable in response to the flow of fluid under pressure from said main reservoir to said brake pipe,
  b. a two-position spool-type valve operably connected to said movable abutment and movable by said abutment, upon the establishment of a chosen pressure differential by said fluid flow responsive means, from a first position in which it establishes two parallel communications between said brake pipe and said one side of said movable abutment that is operably connected to said first valve means, to a second position in which it cuts off flow of fluid under pressure through only one of said two parallel communications, and
  c. one-way flow valve means disposed in the other of said two parallel communications to provide for flow of fluid under pressure therethrough from said brake pipe to said one side of that abutment operably connected to said first valve means and prevent flow in the opposite direction, thereby rendering this abutment operably responsive to a reduction of brake pipe pressure on the other side thereof subsequent to the movement of said spool-type valve to its second position to cause said first valve means to effect the supply of fluid under pressure from said source of fluid under pressure to said brake pipe cut-off valve and operably responsive to a subsequent initial increase in the pressure in said brake pipe, while said spool-type valve remains in its second position, to cause said first valve means to cut off the supply of fluid under pressure from said source of fluid under pressure to said brake pipe cut-off valve means and release fluid under pressure from said cut-off valve means to atmosphere.

7. A locomotive brake control apparatus, as recited in claim 1, further characterized in that said brake valve has an emergency valve movable between a release position and an emergency position, and said brake control apparatus further comprises:
  a. a double check valve device having a delivery port connected to said brake pipe cut-off valve of said brake valve and a pair of inlet ports, to one of which said first valve means supplies fluid under pressure from said source of fluid under pressure, and
  b. a charging cut-off pilot valve device operable in response to an emergency rate of reduction of pressure in said brake pipe to effect the supply of fluid under pressure from said source of fluid under pressure to the other inlet port of said double check valve device whereby fluid under pressure is supplied to said brake pipe cut-off valve means by said charging cut-off pilot valve device, subsequent to operation of said first valve means to supply fluid under pressure to and thereafter release fluid under pressure from said brake pipe cut-off valve means, to maintain said cut-off valve means closed for a chosen length of time after the return of said emergency valve to its release position subsequent to movement of said emergency valve to its emergency position following operation of said charging cut-off pilot valve device to effect the supply of fluid under pressure to said brake pipe cut-off valve.

8. A locomotive brake control apparatus, as recited in claim 1, further characterized by biasing means disposed on the other side of said abutment to prevent operation of said first valve means prior to a chosen reduction of pressure in said brake pipe effected subsequent to operation of said second valve means to prevent flow of fluid under pressure from said one side of said abutment to said brake pipe.

9. A locomotive brake control apparatus, as recited in claim 2, further characterized in that said two-position valve comprises a spool-type valve having an elongated peripheral annular groove thereon via which, in said one position of said valve, said two parallel communications are established, and via which, in said other position of said valve, only one of said two parallel communications is established.

10. A locomotive brake control apparatus, as recited in claim 4, further characterized in that said one-way flow valve means is disposed between said brake pipe and said second valve means so as to provide for flow in the direction from said brake pipe to said second valve means.

11. A locomotive brake control apparatus, as recited in claim 6, further characterized by biasing means disposed on one side of said abutment to prevent movement of said two-position spool-type valve by said abutment prior to establishing on the opposite sides thereof said chosen pressure differential.

12. For use in a locomotive brake control apparatus, wherein a brake valve has a relay valve operative to effect the supply of fluid under pressure from a main reservoir to a brake pipe and a fluid pressure operated brake pipe cut-off valve means interposed between said relay valve and said brake pipe and operative in response to the supply of fluid under pressure thereto to cut off flow of fluid under pressure supplied from said main reservoir to said brake pipe, there being a means, operable in response to the rate of flow of fluid under pressure from said main reservoir to said brake pipe to establish a corresponding differential, interposed in a conduit connecting said main reservoir to said relay valve, wherein the improvement comprises:

a. a differential pressure operated means for controlling the supply of fluid under pressure from a source of fluid under pressure to said fluid pressure operated brake pipe cut-off valve means, said differential pressure operated means comprising:

i. a first valve means operable to effect the supply of fluid under pressure from said source of fluid under pressure to said brake pipe cut-off valve means and the subsequent release of said fluid under pressure from said cut-off valve means to atmosphere, ii. a movable abutment operably connected to said first valve means for effecting the operation thereof, the respective opposite sides of said abutment being subject to fluid under pressure supplied thereto from said brake pipe, and iii. a second valve means operable by fluid under pressure to control the supply of fluid under pressure from said brake pipe to one side of said movable abutment and operable in response to the establishment of a chosen differential by said rate of flow responsive means to prevent flow of fluid under pressure from said one side of said movable abutment to said brake pipe to render said movable abutment operative in response to a reduction of brake pipe pressure on the opposite side thereof to cause said first valve means to effect the supply of fluid under pressure from said source of fluid under pressure to said fluid pressure operated brake pipe cut-off valve means to cause operation thereof to cut off flow of fluid under pressure supplied from said main reservoir to said brake pipe by operation of said relay valve.

13. A differential pressure operated means, as recited in claim 12, further characterized in that said second valve means operable by fluid under pressure comprises a two-position valve, said valve in one of said positions establishing two parallel communications from said brake pipe to said one side of said movable abutment and in the other of said positions closing one of said two parallel communications.

14. A differential pressure operated means, as recited in claim 12, further characterized in that said differential pressure operated means comprises a volume means connected to said one side of said movable abutment.

15. A differential pressure operated means, as recited in claim 12, further characterized in that said second valve means operable by fluid under pressure comprises:

a. a movable abutment subject to the pressure differential established by said means operable in response to the flow of fluid under pressure from said main reservoir to said brake pipe, and b. a two-position spool-type valve operably connected to said movable abutment and movable by said abutment, upon the establishment of a chosen pressure differential by said fluid flow responsive means, from a first position, in which it establishes two parallel communications through which fluid under pressure may be supplied to said one side of said movable abutment operatively connected to said first valve means, to a second position in which it closes only one of said two parallel communications.

16. A differential pressure operated means, as recited in claim 12, further characterized by biasing means disposed on the other side of said abutment to prevent operation of said first valve means prior to the reduction of the pressure of the fluid under pressure effective on said other side of said abutment to a chosen value less than the pressure of the fluid under pressure effective on said one side.

17. A differential pressure operated means, as recited in claim 13, further characterized in that said two-position valve comprises a spool-type valve having an elongated peripheral annular groove thereon via which, in said one position of said valve, said two parallel communications are established, and via which, in said other position of said valve, only one of said two parallel communications is established.

18. A differential pressure operated means, as recited in claim 14, further characterized by biasing means disposed on one side of said abutment to prevent movement of said two-position spool-type valve by said abutment prior to the establishment on the opposite sides thereof of a chosen pressure differential.

19. A differential pressure operated means, as recited in claim 15, further comprising:

a. a first biasing means disposed on the other side of said abutment operably connected to said first means to prevent operation of said first valve means prior to the reduction of the pressure of fluid under pressure effective on said other side of said abutment to a chosen value less than the pressure of fluid under pressure effective on said one side, and b. a second biasing means disposed on one side of said abutment operably connected to said spool-type valve to prevent movement of said spool-type valve from its first position to its second position by said abutment prior to the pressure on said one side exceeding the pressure on the opposite side by a chosen amount.

* * * * *

UNITED STATES PATENT OFFICE
CERTIFICATE OF CORRECTION

Patent No. 3,749,453          Dated July 31, 1973

Inventor(s) Richard L. Wilson and Robert J. Worbois

It is certified that error appears in the above-identified patent and that said Letters Patent are hereby corrected as shown below:

Column 3, line 51, after "wall" insert --surface--

Column 5, line 49, after "wall" insert --surface--

Column 9, line 11, "chamber" should be --chambers-- line 60, after "have" insert --not--

Signed and sealed this 19th day of February 1974.

(SEAL)
Attest:

EDWARD M.FLETCHER,JR.
Attesting Officer

C. MARSHALL DANN
Commissioner of Patents